United States Patent
Lee et al.

(10) Patent No.: US 9,635,267 B2
(45) Date of Patent: Apr. 25, 2017

(54) METHOD AND MOBILE TERMINAL FOR IMPLEMENTING PREVIEW CONTROL

(71) Applicant: Samsung Electronics Co., Ltd, Gyeonggi-do (KR)

(72) Inventors: Wooyong Lee, Gyeonggi-do (KR); Yunson Yoo, Chungcheongnam-do (KR); Hyejin Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/149,716

(22) Filed: Jan. 7, 2014

(65) Prior Publication Data

US 2014/0192245 A1  Jul. 10, 2014

(30) Foreign Application Priority Data

Jan. 7, 2013 (KR) .................. 10-2013-0001821

(51) Int. Cl.
| | |
|---|---|
| H04N 5/232 | (2006.01) |
| G06F 3/01 | (2006.01) |
| H04N 1/00 | (2006.01) |
| G06F 3/0488 | (2013.01) |
| G06F 3/0484 | (2013.01) |
| G06F 3/03 | (2006.01) |
| H04N 5/225 | (2006.01) |

(Continued)

(52) U.S. Cl.
CPC ......... H04N 5/23293 (2013.01); G06F 3/017 (2013.01); G06F 3/0304 (2013.01); G06F 3/04845 (2013.01); G06F 3/04883 (2013.01); H04N 1/00381 (2013.01); H04N 1/00411 (2013.01); H04N 1/00442 (2013.01); H04N 5/2258 (2013.01); H04N 5/23216 (2013.01); H04N 5/23245 (2013.01); H04N 1/00307 (2013.01); H04N 2007/145 (2013.01); H04N 2101/00 (2013.01); H04N 2201/0084 (2013.01)

(58) Field of Classification Search
CPC .......... H04N 5/23293; H04N 5/23216; H04N 1/00381; H04N 1/00307–1/00442; G06F 3/0304; G06F 3/04845–3/04883
See application file for complete search history.

(56) References Cited

U.S. PATENT DOCUMENTS

| 2010/0164959 A1* | 7/2010 | Brown et al. ................. 345/473 |
| 2012/0092529 A1* | 4/2012 | Choi .................. H04N 5/23219 348/239 |

(Continued)

FOREIGN PATENT DOCUMENTS

| JP | WO2011158542 | * 12/2011 | ............. G06F 3/011 |
| KR | 10-2007-0117284 | 12/2007 | |

*Primary Examiner* — Christopher K Peterson

(57) ABSTRACT

A method for controlling the preview of images taken by multiple cameras includes displaying a first preview image of a first camera on a screen, detecting a first user gesture through a second camera and a second user gesture on a touch panel mounted on the screen, and displaying a second preview image of the second camera along with the first preview image of the first camera in response to the first and second user gestures. A mobile terminal includes a first camera and a second camera, and a control unit configured to detect a first user gesture through a second camera and a second user gesture on a touch panel in a state of displaying the first preview image.

20 Claims, 20 Drawing Sheets

(51) Int. Cl.
*H04N 101/00* (2006.01)
*H04N 7/14* (2006.01)

(56) References Cited

U.S. PATENT DOCUMENTS

| 2012/0274808 A1* | 11/2012 | Chong et al. | 348/234 |
| 2013/0050458 A1* | 2/2013 | Kim et al. | 348/77 |
| 2013/0088426 A1* | 4/2013 | Shigeta | G06F 3/017 |
| | | | 345/156 |

* cited by examiner

METHOD AND MOBILE TERMINAL FOR IMPLEMENTING PREVIEW CONTROL

CROSS-REFERENCE TO RELATED APPLICATION(S) AND CLAIM OF PRIORITY

The present application is related to and claims the benefit under 35 U.S.C. §119(a) of a Korean patent application filed on Jan. 7, 2013 in the Korean Intellectual Property Office and assigned Serial No. 10-2013-0001821, the entire disclosure of which is hereby incorporated by reference.

TECHNICAL FIELD

The present disclosure relates to a method for controlling the preview of images taken by multiple cameras.

BACKGROUND

Typically, recent mobile terminals such as smartphone and cellular phone are equipped with a camera such that the user is capable of capturing the preview image from the camera by pressing the shutter key to save the captured image in the memory. Meanwhile, a mobile terminal equipped with dual cameras is capable of operating in one of single preview and dual preview modes. That is, the dual camera-equipped mobile terminal is capable of displaying the preview images of the first and second cameras simultaneously or selectively. The user can switch between the distinct preview modes using a hard key of the mobile terminal or a menu presented on the screen. However, the mode switching manipulation with the hard key or the menu lacks in intuitiveness and is laborious.

SUMMARY OF THE DISCLOSURE

To address the above-discussed deficiencies of the prior art, it is a primary object to provide a method for controlling the preview of images taken by dual cameras intuitively and conveniently from the user's view point and a mobile terminal for implementing the same.

In accordance with an aspect of the present disclosure, a preview control method of a mobile terminal includes displaying a first preview image of a first camera on a screen; detecting a first user gesture through a second camera and a second user gesture on a touch panel mounted on the screen; and displaying a second preview image of the second camera along with the first preview image of the first camera in response to the first and second user gestures.

In accordance with another aspect of the present disclosure, a preview control method of a mobile terminal includes displaying a first preview image of a first camera on a screen; detecting a first user gesture through a second camera and a second user gesture on a touch panel mounted on the screen; and replacing the first preview image with a second preview image of the second camera in response to the first and second user gestures.

In accordance with another aspect of the present disclosure, a preview control method of a mobile terminal includes displaying a first preview image of a first camera on a screen; detecting a boundary-in gesture made by moving a touch input tool from an outside to an inside of the screen on a touch panel mounted on the screen; and replacing the first preview image with a second preview image of a second camera in response to the boundary-in gesture.

In accordance with another aspect of the present disclosure, a mobile terminal includes a first camera and a second camera; a display unit which displays at least one of a first preview image of the first camera and a second preview image of the second camera; a touch panel mounted on the screen; and a control unit which detects a first user gesture through a second camera and a second user gesture on a touch panel in a state of displaying the first preview image and controls the display unit to display the second preview image along with the first preview image in response to the first and second user gestures.

In accordance with another aspect of the present disclosure, a mobile terminal includes a first camera and a second camera; a display unit which displays at least one of a first preview image of the first camera and a second preview image of the second camera on a screen; a touch panel mounted on the screen; and a control unit which detects a boundary-in gesture made a boundary-in gesture made by moving a touch input tool from an outside to an inside of the screen on the touch panel in a state of displaying the first preview image on the screen and controls the display unit to display the second preview image along with the first preview image in response to the boundary-in gesture.

In accordance with another aspect of the present disclosure, a mobile terminal includes a first camera and a second camera; a display unit which displays at least one of a first preview image of the first camera and a second preview image of the second camera on a screen; a touch panel mounted on the screen; and a control unit which detects a first user gesture through the second camera and a second user gesture on the touch panel in a state of displaying a first preview image of a first camera on a screen and controls the display unit to replace the first preview image with a second preview image of the second camera in response to the first and second user gestures.

In accordance with still another aspect of the present disclosure, a mobile terminal includes a first camera and a second camera; a display unit which displays at least one of a first preview image of the first camera and a second preview image of the second camera on a screen; a touch panel mounted on the screen; and a control unit which detects a boundary-in gesture made by moving a touch input tool from an outside to an inside of the screen on the touch panel in a state of displaying the first preview image on the screen and controls the display unit to replace the first preview image with a second preview image of a second camera in response to the boundary-in gesture.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
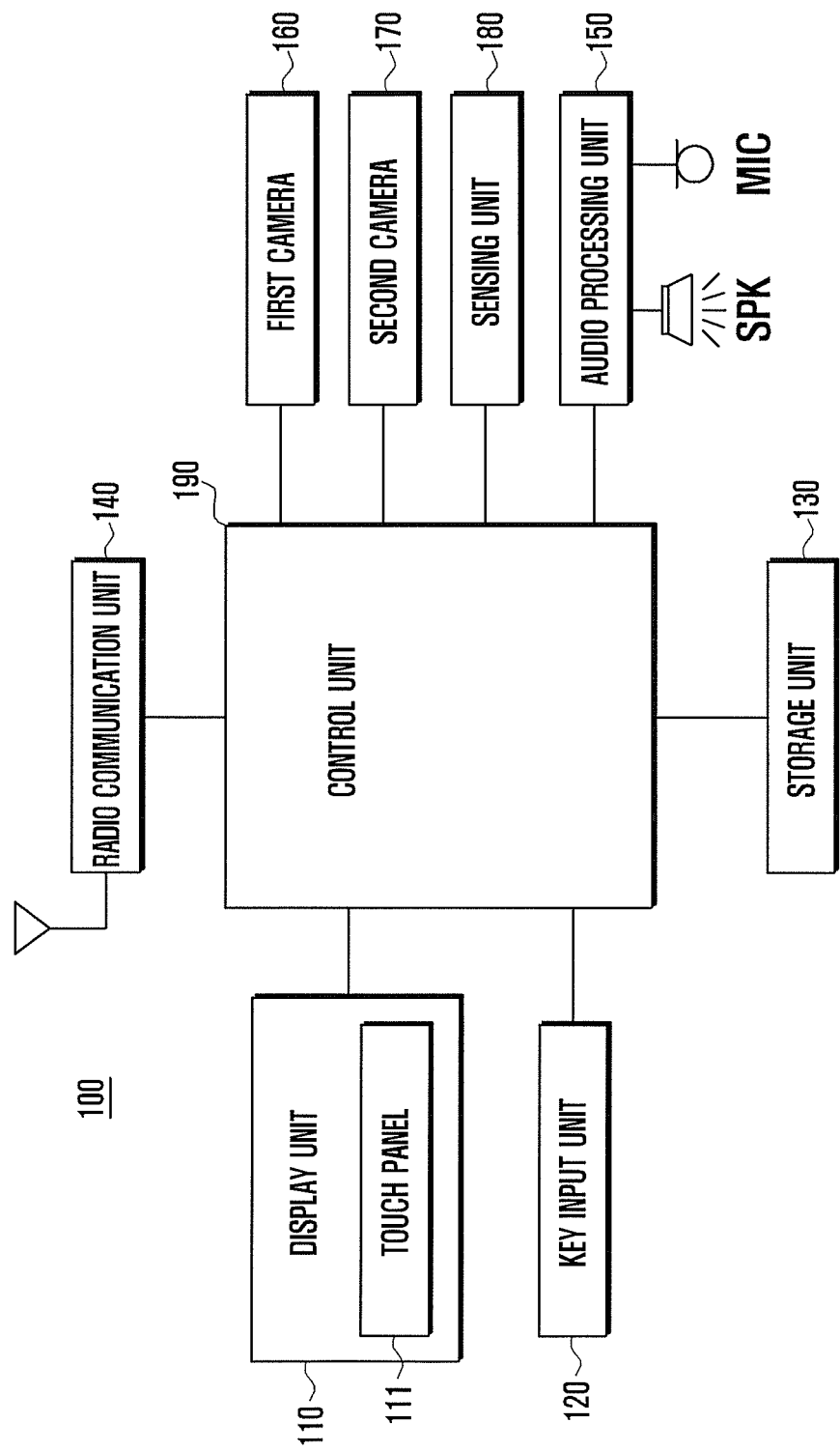
FIG. 1 is a block diagram illustrating a configuration of the mobile terminal according to an embodiment of the present invention.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

In the present disclosure, the mobile terminal is a portable electronic device having dual cameras such as smartphone, tablet PC, laptop PC, and digital camera. The preview control method and mobile terminal for implementing the same are described hereinafter. The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents. In the drawings, certain elements may be exaggerated or omitted or schematically depicted for clarity of the disclosure, and the actual sizes of the elements are not reflected. Thus, the present disclosure is not limited by a relative size or distance in the attached drawings. Detailed description of well-known functions and structures incorporated herein may be omitted to avoid obscuring the subject matter of the present disclosure.

FIG. 1 is a block diagram illustrating a configuration of the mobile terminal according to an embodiment of the present disclosure.

As shown in FIG. 1, the mobile terminal 100 according to an embodiment of the present disclosure includes a display unit 110, a key input unit 120, a storage unit 130, a radio communication unit 140, an audio processing unit 150, a speaker (SPK), a microphone (MIC), a first camera 160, a second camera 170, a sensing unit 180, and a control unit 190.

The display unit 110 displays data on the screen under the control of the control unit 190. That is, the control unit 190 processes the data (e.g. decoding and resizing) and buffers the processed data in the buffer, and the display unit 110 converts the buffered data to analog signal to display the data on the screen. If the display unit 110 powers on, it displays a lock image on the screen. If an unlock information is detected in the state of displaying the lock image, the control unit 190 unlocks the screen. That is, the display unit 110 displays a home image instead of the lock image under the control of the control unit 190. The home image includes a background image (e.g. photo configured by the user) and a plurality of icons arranged on the photo. Here, the icons represent corresponding applications and contents (e.g. photo file, video file, recording file, document, and message). If the user selects one of the icons, i.e. a camera application icon, the control unit 190 executes the camera application and controls the display unit 110 to display a preview of the image from the camera. The display unit 110 receives the preview image from the control unit 190 and converts the preview image to analog signal to display the preview. The display unit 110 is capable of displaying a menu on the preview image in an overlapped manner in order for the user to control the functions of the cameras 160 and 170. The control unit 190 controls the cameras 160 and 170 in response to the user's selection of the shutter key provided by the menu. The preview image has a low resolution format acquired by processing the raw data of the high resolution image so as to fit for the screen size. The raw data is of the digital data format generated by the camera without being processed.

The display unit 110 displays plural images in a multi-layer structure under the control of the control unit 190. For example, the display unit 110 is capable of displaying the first preview image from the first camera 160 on the screen and the second preview image from the second camera 170 on the first preview image. At this time, the first preview image may be displayed on the entire screen area, and the second preview image may be displayed on a partial area of the screen. Accordingly, the user can see the second preview image entirely and the first image partially. Of course, the display unit 110 is also capable of displaying the second preview image on the entire screen area under the control of the control unit 190. At this time, the second preview image may be displayed transparently. In this case, the user can see the first preview image entirely. All the preview images can be displayed on the top most layer of the screen. That is, the display unit 110 is capable of displaying the first preview image on the first area and the second preview image on the second area of the screen without overlap therebetween. The first and second preview images can be displayed in Picture In Picture (PIP) mode or dual preview mode. In contrast, one of the preview images is displayed in a single preview mode in which one of the first and second preview images is displayed.

The display unit 110 may be implemented with one of Liquid Crystal Display (LCD), Organic Light Emitted Diode (OLED), Active Matrix Organic Light Emitted Diode (AMOLED), and flexible display.

The touch panel 111 is mounted on the surface of the display panel of the display unit 110. In detail, the touch panel 111 can be placed on the surface of the display panel of the display unit 100 in an add-on type or inserted into the display unit 110 in an on-cell or in-cell type.

The touch panel 111 generates an analog input signal (e.g. touch event) in response to the user's gesture made on the touch panel 111, performs Analog/Digital (A/D) conversion on the analog signal to generate a digital signal to the control unit 190. Here, the input signal includes the touch coordinates (x,y). For example, the controller of the touch panel 111 determines representative coordinates among plural touch coordinates and transfers the representative touch coordinates to the control unit 190. This control operation may be performed by the control unit 190. The touch coordinates may be the pixel coordinates. For example, if the screen resolution is 640 (number of pixels in horizontal direction)*480 (number of pixels in vertical direction), the X axis coordinate is (0, 640) and the Y axis coordinate is (0, 480). If the touch coordinates are received from the touch panel 111, the control unit 190 determines that a touch gesture has made on the touch panel 111 with a touch input tool (e.g. finger and pen) and, if the touch coordinates are received no longer, the touch of the touch input tool has been released. If the coordinates are changed, e.g. from (x0, y0) to (x1, y1), and the displacement (e.g., $D(D^2=(x0-x1)^2+(y0-y1)^2)$ is greater than a movement threshold (e.g., 1 millimeter), the control unit 190 determines that the touch input tool has moved. If the movement of the touch input tool is detected, the control unit 190 calculates the touch displacements dx, dy and the movement speed of the touch input tool. The control unit 190 can differentiate among user's touch gestures of single touch, multi-touch, tap, double tap, long tap, tap & touch, drag, flick, press, pinch in, pinch out, boundary in, boundary out, and twist, based on the touch coordinates, touch release, tough movement, touch displacement, touch speed, and the like.

The single touch denotes the gesture of contacting a point of the touch panel 111 by means of a touch input tool, the multi-touch denotes the gesture of contacting multiple points of the touch panel 111 by means of a touch input tool, e.g. thumb and index finger, and the tap denotes the gesture in which the touch input tool contacts and then releases immediately at a point without movement, the double tap denotes of the gesture of making the tap twice at a point, the long tap denotes the gesture of maintaining the tap over a predetermined time duration without movement, the tap & touch denotes the gesture of making a tap at a point on the screen and a touch subsequently in a predetermined time (e.g., 0.5 second), the drag denotes the gesture of making a contact at a point on the screen by means of a touch input tool and moving the touch input tool without releasing the contact, the flick denotes the gesture of moving the touch input tool faster than the drag gesture and the releasing the contact of the touch input tool, the press denotes the gesture of making a touch and pressing at a point, the pinch-in is the gesture of making the contact at two points and narrowing the distance between the two contact points of the touch input tools, the pinch-out is the gesture of making the contact at two points and widening the distance between the two contact points, the twist is the gesture of making the contact a two points with multiple touch input tools and then rotating the touch input tools, the boundary-in is the gesture of moving a touch input tool from the outside of the screen boundary to the inside of the screen boundary (i.e., the gesture in which the touch input tool enters the screen), and the boundary-out is the gesture of moving a touch input tool from the inside of the screen boundary to the outside of the screen boundary (i.e., the gesture in which the touch input tool goes out of the screen).

The touch panel 111 can be an integrated touch panel including a hand touch panel for detecting a hand gesture and a pen touch panel for detecting a pen gesture. Here, the hand touch panel is implemented in capacitive type. Of course, the hand touch panel can be implemented in resistive type, infrared type, or microwave type. The hand touch panel is capable of detecting the touch event made by means of an object (e.g., a conductive material object capable of influencing the electric capacitance) as well as the touch even made by means of a hand gesture of the user. The pen touch panel can be implemented in electromagnetic induction type. In this case, the pen touch panel detects the touch event made by means of a stylus pen manufactured to form a magnetic field.

The key input unit 120 includes a plurality of alphanumeric keys for inputting alphanumeric information and function keys for configuring and setting various functions. These keys may include a menu key, a screen on/off key, a power on/off key, a volume control key, and the like. The key input unit 120 is capable of generating a key event signal related to the user setting and function control of the input terminal 100 to the control unit 190. The key event is capable of a power on/off event, a volume control event, a screen on/off event, a shutter ever, and the like. the control unit 190 is capable of controlling the components in response to the key event. The keys of the key input unit 120 are referred to as hard keys while the virtual keys displayed by the display unit 110 are referred to as soft keys.

The storage unit 130 may be implemented with at least one of a disk, Random Access Memory (RAM), Read Only Memory (ROM), and flash memory. The storage unit 130 stores the data generated in the mobile terminal 100 and received from output external devices (e.g. server, desktop PC, and tablet PC) through the radio communication unit 140 under the control of the control unit 190.

The storage unit stores a booting program, at least one Operating System (OS), and applications. The OS is responsible for providing interfaces between hardware and applications and among the applications and manages the computer resources such as CPU, GPU, main memory, and storage unit 130. The applications are classified into the embedded application and the $3^{rd}$ party applications. The embedded applications may include a web browser application, an email application, and an instant messenger application. If the battery power is supplied to the control unit 190, the booting program is loaded on the main memory of the control unit 190. The booting program loads the main memory the OS. The OS loads the applications on the main memory.

The radio communication unit 140 is responsible for voice, video, and data communication with another terminal through a network under the control of the control unit 190. The radio communication unit 140 includes an RF transmitter for frequency up-converting and amplifying the signal to be transmitted and an RF receiver for low noise amplifying and down converting the received signal. The radio communication unit 140 includes at least one of a cellular communication module (e.g., $3^{rd}$, $3.5^{th}$, and $4^{th}$ Generation mobile communication modules), a digital broadcast module (e.g., a DMB module), and a short range communication module (e.g., a Wi-Fi module, Bluetooth module, and Near Field Communication (NFC) module).

The audio processing unit 150 performs speech recognition, voice recording, and audio signal (e.g. voice) input and output for digital recording and call processing in cooperation with a speaker (SPK) and a microphone (MIC). The audio processing unit 150 converts the analog audio signal input through the microphone (MIC) to the digital audio signal and sends the digital audio signal to the control unit 190. The speaker (SPK) converts the audio signal from the audio processing unit 150 to an audible sound wave. The microphone (MIC) converts the sound wave of human voice or output from a sound source to the audio signal.

The first and second cameras 160 and 170 take subjects and transfer the live images of the subject to the control unit 190 under the control of the control unit 190. Each of the first and second cameras 160 and 170 includes a set of lens for collecting light, an image sensor for converting the light to electric signals, and an Image Signal Processor (ISP) for processing the electric signals from the image sensor to output raw data to the control unit 190. Here, the ISP processes the raw data to generate the preview image to the control unit 190 under the control of the control unit 190. Then the control unit 190 controls the display unit 110 to display the preview image on the screen. The ISP also processes the raw image to generate a compressed image (e.g. JPEG image) to the control unit 190 under the control of the control unit 190. The control unit 190 detects a shutter event (e.g. tap on the shutter button presented on the display unit 110) and saves the compressed image in response to the shutter event.

The sensing unit 180 detects physical quantity (e.g., acceleration, pressure, light quantity) or change therein to generate detection information (e.g., voltage displacement (iv) to the control unit 190. The sensing unit 180 includes at least one of an acceleration sensor, luminance sensor, and proximity sensor. The sensors may be integrated into a single chip or implemented in the forms of independent chips.

The control unit 190 controls overall operations of the input terminal 100, signal flows among the components of the input terminal 100, and power supply to the components, and processes data. The control unit 190 controls preview of live images in response to a user's gesture. The user's gesture is detected by at least one of the touch panel 111, a camera oriented in the same direction of the screen (e.g., second camera 170), and the sensing unit 180.

The control unit 190 includes one or more Central Processing Units (CPUs). The CPU is the main control unit of a computer system for performing operation and comparison on data and interpreting and executing commands. The CPU includes various registers storing data and commands temporarily. The control unit 190 may include one or more Graphic Processing Units (GPUs). The GPU is the graphic control unit for performing operation and comparison on the graphic data and interpreting and executing commands related to the graphic data instead of the CPU. Each of the CPU and GPU can be manufactured as a package of two or more independent cores (e.g., quad-core). The CPU and GPU may be integrated in the form of System on Chip (SoC). The CPU and GPU also may be multilayer-packaged. Meanwhile, the structure of the CPU and GPU can be referred to as Application Processor (AP).

The control unit 190 includes a main memory unit, e.g., Random Access Memory (RAM). The main memory unit stores various programs including a booting program, Operating System (OS), and applications. That is, each of the CPUs and GPUs of the control unit 190 accesses a program to interpret program commands and execute a function according to the interpretation result. The control unit 190 includes a cache memory for storing the data to be written to the storage unit 130 and read from the storage unit 130 temporarily.

The mobile terminal 100 may further include various components that are not depicted in the drawing such as an ear jack, a Global Positioning System (GPS) module, a vibration motor, and other accessories. Here, the accessories may be detachable parts of the mobile terminal 100 such as a pen for use in making touch gestures.

Figure 2:
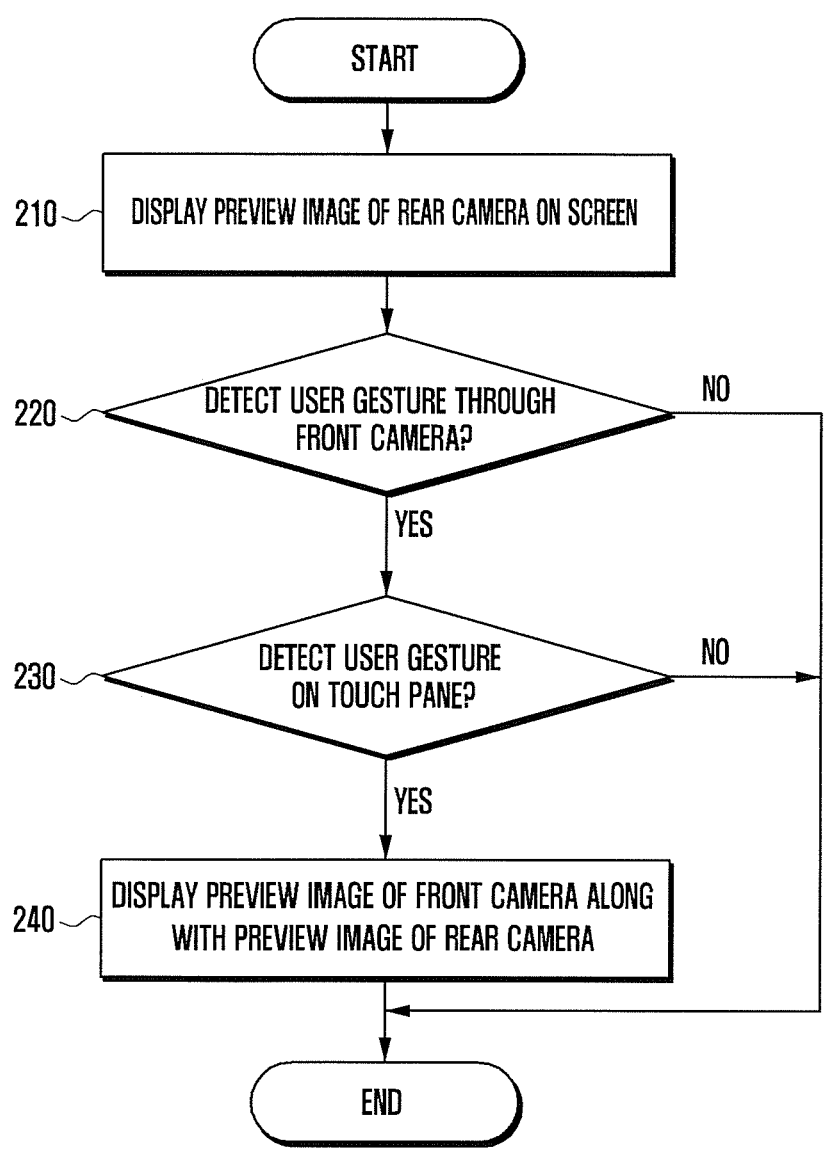
FIG. 2 is a flowchart illustrating a procedure of switching from a signal preview mode to a dual preview mode in the preview control method according to an embodiment of the present invention.
Figure 3:
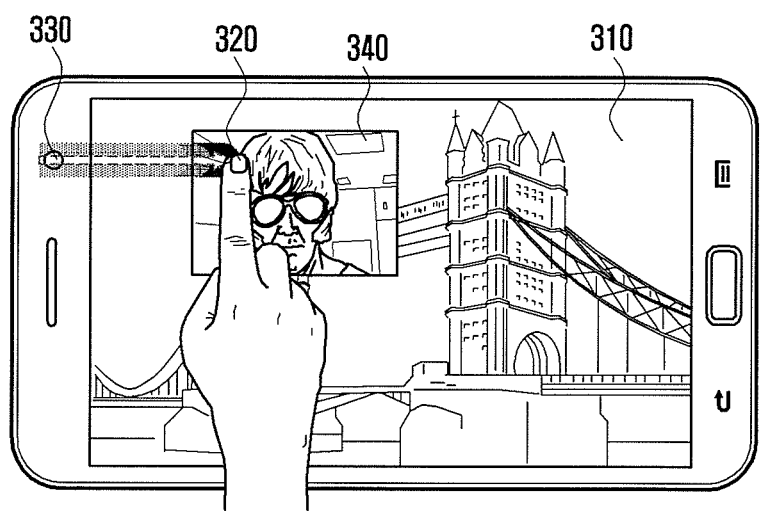
FIG. 3 is a diagram illustrating an screen display for explaining the procedure of switching from the single preview mode to the dual preview mode according to the embodiment of FIG. 2.

FIG. 2 is a flowchart illustrating a procedure of switching from a signal preview mode to a dual preview mode in the preview control method according to an embodiment of the present disclosure. FIG. 3 is a diagram illustrating a screen display for explaining the procedure of switching from the single preview mode to the dual preview mode according to the embodiment illustrated in FIG. 2.

The mobile terminal 100 is operating in the single preview mode. That is, the preview image of one of the first and second cameras 160 and 170 is displayed on the screen. In the following description, the first camera is a rear camera mounted on the rear side of the mobile terminal 100, and the second camera 170 is a front camera mounted on the front side of the mobile terminal 100.

Referring to FIGS. 2 and 3, the display unit 110 displays the preview image 310 of the rear camera 160 under the control of the control unit 190 at step 210.

The control unit 190 determines whether any user gesture is detected by the front camera 170 at step 220. If the user covers and then uncovers the front camera 170 with the touch input tool 320 (e.g., index finger), the image sensor of the front camera 170 detects the change in light quantity and provides the detection information to the control unit 190. The control unit 190 calculates the displacement based on the detection information and determines that, if the displacement is greater than a predetermined threshold, a user gesture has been made. If the user gesture is detected through the front camera 170, the control unit 190 controls to enter a standby mode before switching from the single preview mode to the dual preview mode. In the standby mode, the control unit 190 controls the front camera 170 to generate a preview image and buffers the preview image in a buffer.

If the user gesture is detected through the front camera 170, the control unit 190 determines whether another user gesture is detected on the touch panel 111 at step 230. Here, the user gesture detected on the touch panel 111 may be correlated with the user gesture detected through the front camera 170. That is, the two user gestures may be a single combination gesture. As shown in FIG. 3, the user may make a touch on the lens window 330 with a touch input tool 320 and moves the touch input tool 320 in a direction to the screen subsequently (i.e., boundary-in). Of course, the user gesture detected on the touch panel 111 may not be correlated with the user gesture detected on the front camera 170. That is, the two user gesture may be made inconsecutively. For example, the user may make a touch on the lens window 330 of the front camera 170 and another gesture on the screen after releasing the previous touch. Here, the user gestures available on the screen include single touch, multi-touch, tap, double tap, long tap, tap & touch, drag, flick, press, pinch in, pinch out, boundary in, boundary out, and twist, based on the touch coordinates, touch release, tough movement, touch displacement, touch speed, and the like.

If a user gesture is detected on the touch panel 111 in a predetermined time (e.g. 1 second) since the detection of another user gesture on the front camera, the control unit 190 switching the current preview mode from the single preview mode to the dual preview mode at step 240. In the dual preview mode, the display unit 110 displays the front preview image 340 of the front camera 170 and the rear preview image 310 of the rear camera 160 simultaneously under the control of the control unit 190. For example, the control unit 190 controls the display unit 110 to display the front preview image 340 appears crossing the screen boundary in response to the boundary-in gesture made with the touch input tool 320 as shown in FIG. 3. That is, the display unit 110 provides the user with a feedback of the appearance of the preview image 340 across the screen boundary.

At step 220, the user gesture may be detected by means of a sensor arranged around the lens window 320, such as a luminance sensor and proximity sensor.

Figure 4:
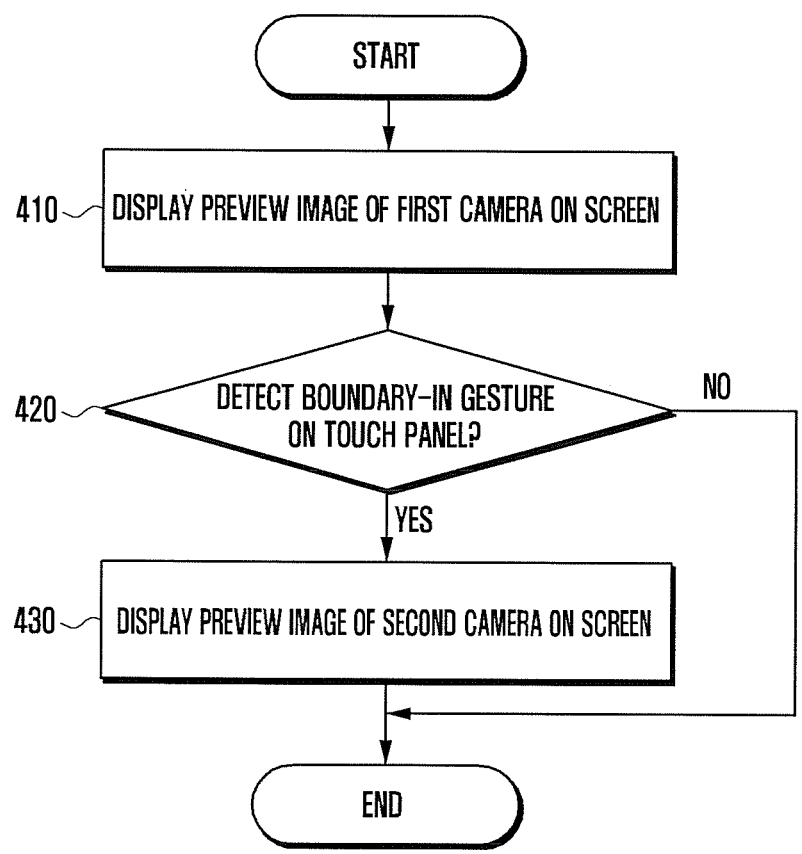
FIG. 4 is a flowchart illustrating a procedure of switching from a single preview mode to a dual preview mode in the preview control method according to another embodiment of the present invention.
Figure 5:
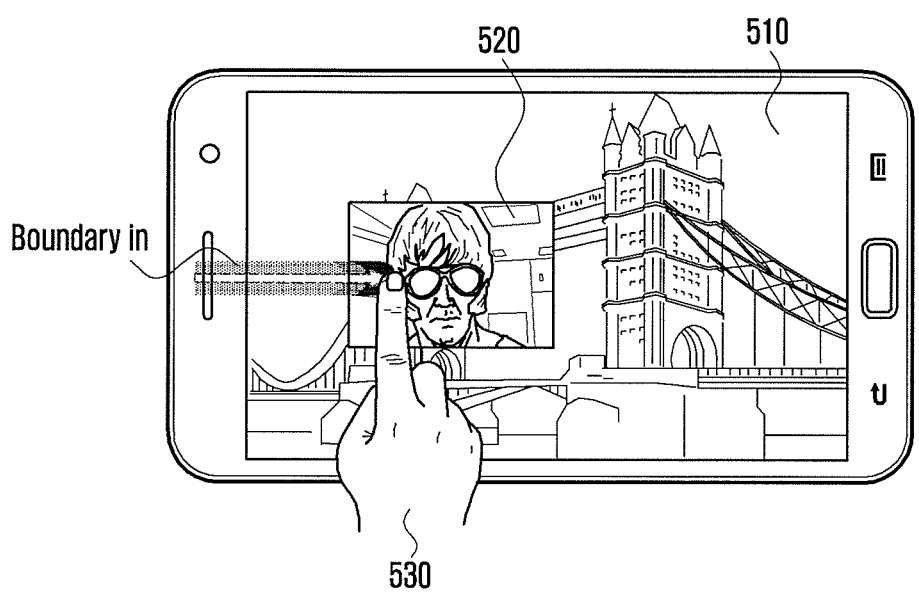
FIG. 5 is a diagram illustrating an screen display for explaining the procedure of switching from the single preview mode to the dual preview mode according to another embodiment of FIG. 4.

FIG. 4 is a flowchart illustrating a procedure of switching from a single preview mode to a dual preview mode in the preview control method according to another embodiment of the present disclosure. FIG. 5 is a diagram illustrating an exemplary screen display for explaining the procedure of switching from the single preview mode to the dual preview mode according to another embodiment illustrated in FIG. 4.

Referring to FIGS. 4 and 5, the display unit 110 displays the preview image 510 of the first camera 160 under the control of the control unit 190. The first camera 160 is mounted on one of the front and rear sides of the mobile terminal 100, and the second camera is mounted on the other side. Of course, the first and second cameras 160 and 170 may be mounted on the same side of the mobile terminal 100. The control unit 190 is operating in a standby mode at step 410. In the standby mode, the control unit 190 controls the second camera 170 to generate a preview image and buffers the preview image in a buffer.

The control unit 190 determines whether a boundary-in gesture is detected on the touch panel 111 as shown in FIG. 5 at step 420.

If the boundary-in gesture is detected on the touch panel 111, the control unit 190 switches the preview mode from the single preview mode to the dual preview mode at step 430. In the dual preview mode, the display unit 110 displays the preview image 520 of the second camera 170 along with the preview image of the first camera 160 simultaneously under the control of the control unit 190. For example, the control unit 190 controls the display unit 110 to display the preview image 520 appears crossing the screen boundary in response to the boundary-in gesture made with the touch input tool 530 as shown in FIG. 5.

Figure 6:
FIGS. 6 and 7 are diagrams illustrating exemplary screen displays for explaining the procedure of switching from the single preview mode to the dual preview mode according to other embodiments of the present invention.
Figure 7:
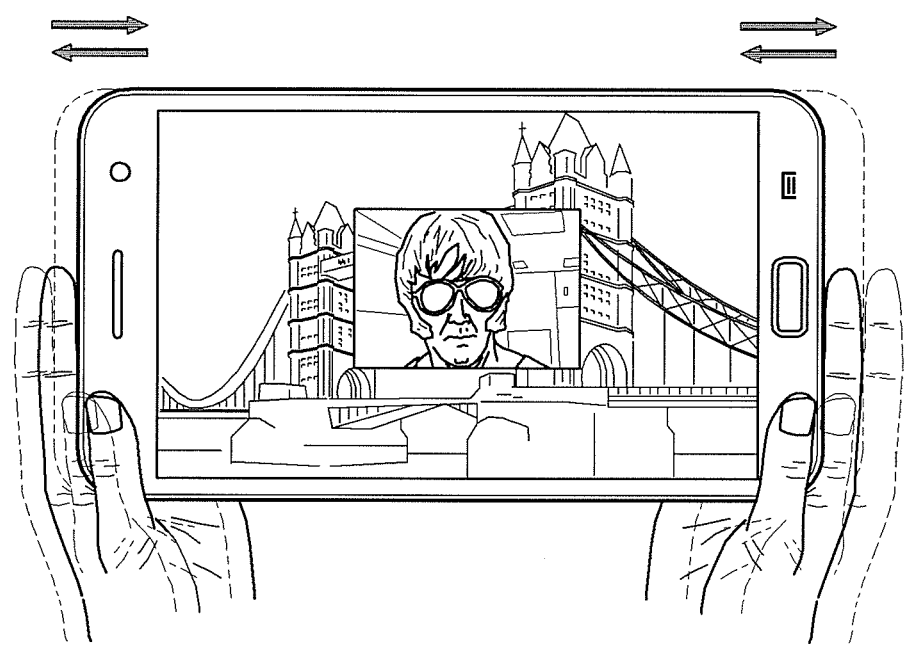

FIGS. 6 and 7 are diagrams illustrating screen displays for explaining the procedure of switching from the single preview mode to the dual preview mode according to another embodiments of the present disclosure.

Hereinabove, the description has been made under the assumption that the user gesture for switching from the single preview mode to the dual preview mode is a touch gesture made on the screen. According to another embodiment of the present disclosure, the user is capable of switching between the preview modes without making a touch gesture on the screen. For example, the user may make a gesture of shaking a hand 620 in front of the lens window 610 as shown in FIG. 6. Then the image sensor of the camera detects the change in light quantity and provides light quantity change information to the control unit 190. The control unit 190 switches the current preview mode to the dual preview mode in response to the light quantity change information.

Referring to FIG. 7, the user makes a gesture of shaking the mobile terminal 100 left and right. Then the acceleration sensor detects the change in acceleration and generates acceleration change information to the control unit 190. The control unit 190 switches the current preview mode to the dual preview mode in response to the acceleration change information.

Figure 8:
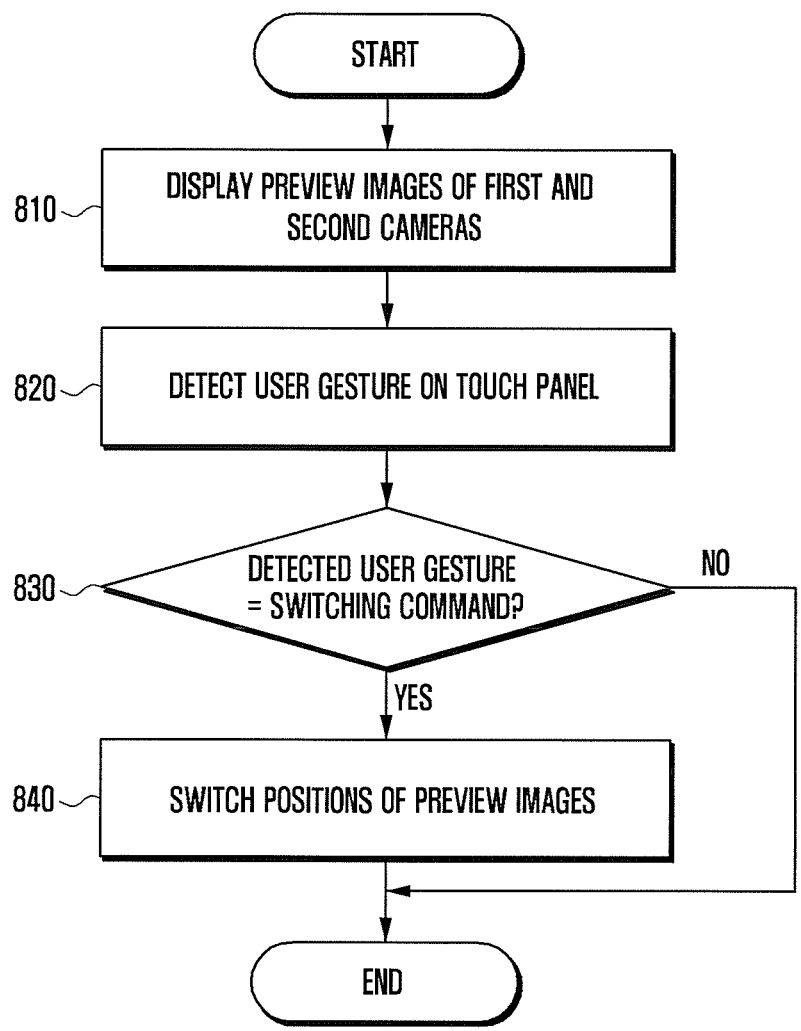
FIG. 8 is a flowchart illustrating a procedure of switching from a dual preview mode to a single preview mode in the preview control method according to an embodiment of the present invention.
Figure 9:
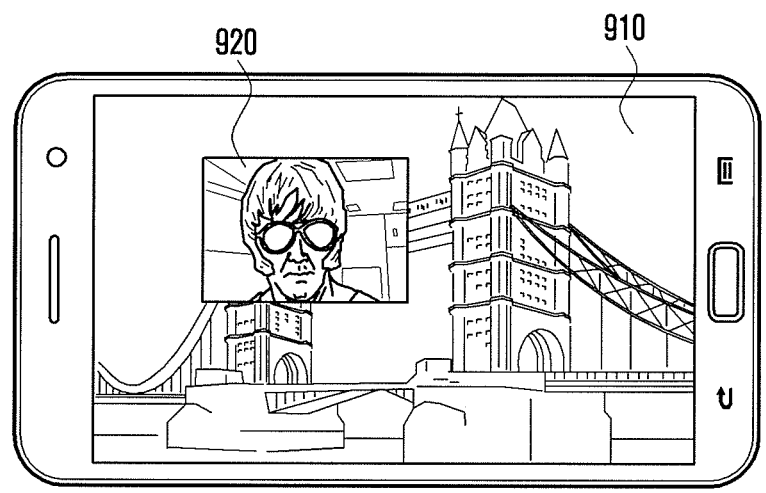
FIGS. 9 to 11 are diagrams illustrating exemplary screen displays for explaining the procedure of switching from the dual preview mode to the single preview mode according to the embodiment of FIG. 8.
Figure 10:
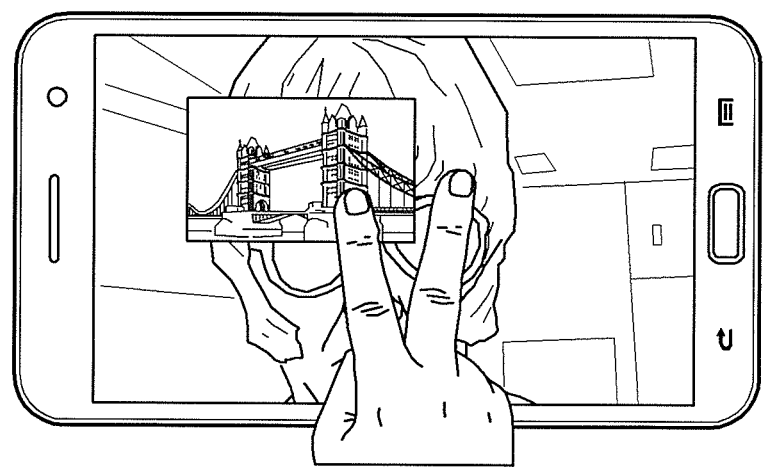
Figure 11:
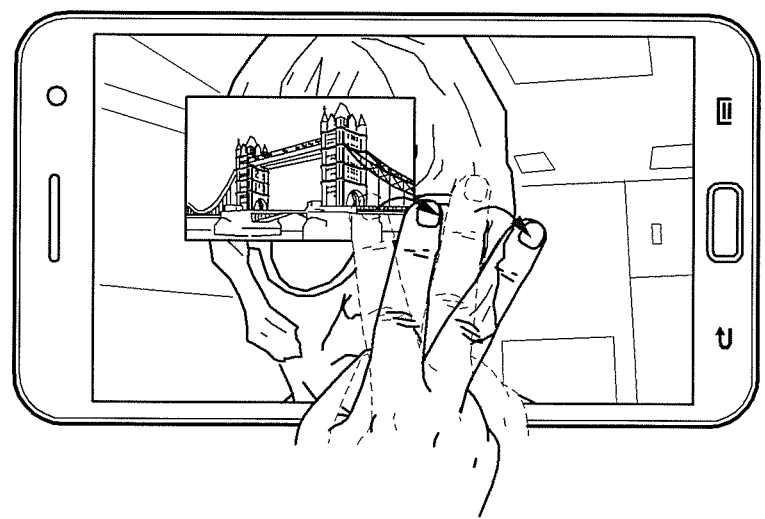

FIG. 8 is a flowchart illustrating a procedure of switching from a dual preview mode to a single preview mode in the preview control method according to an embodiment of the present disclosure. FIGS. 9 to 11 are diagrams illustrating screen displays for explaining the procedure of switching from the dual preview mode to the single preview mode according to the embodiment of FIG. 8.

Referring to FIG. 8, the display unit 110 displays the preview image 910 of the first camera 160 and the preview image 920 of the second camera 170. For example, the preview image 910 is displayed on the entire area of the screen and the preview image 920 of the second camera 170 is displayed on a partial area of the screen. At this time, the preview image 920 of the second camera 170 is displayed on a layer upper than that of the preview image 910 of the first camera 160. Although not depicted, the preview image 910 of the first camera on a first area of the screen and the preview image 920 of the second camera 170 on a second area which is not overlapped with the first area.

The control unit 190 detects a user gesture on the touch panel 111 at step 820. The control unit 1990 determines whether the detected user gesture matches a switching command at step 830. If the user gesture matches the switching command, the control unit 190 switching the positions of the preview images at step 840. For example, if a multi-touch having two contact points on the two preview images is detected as shown in FIG. 10 or if such a multi-touch is followed by a twist gesture as shown in FIG. 11, the control unit 190 switching the positions of the preview images. Of course, the switching command can be input with various gestures (e.g., pinch-in and pinch-out gestures) as well as the multi-touch gesture and multi-touch & twist gesture.

Figure 12:
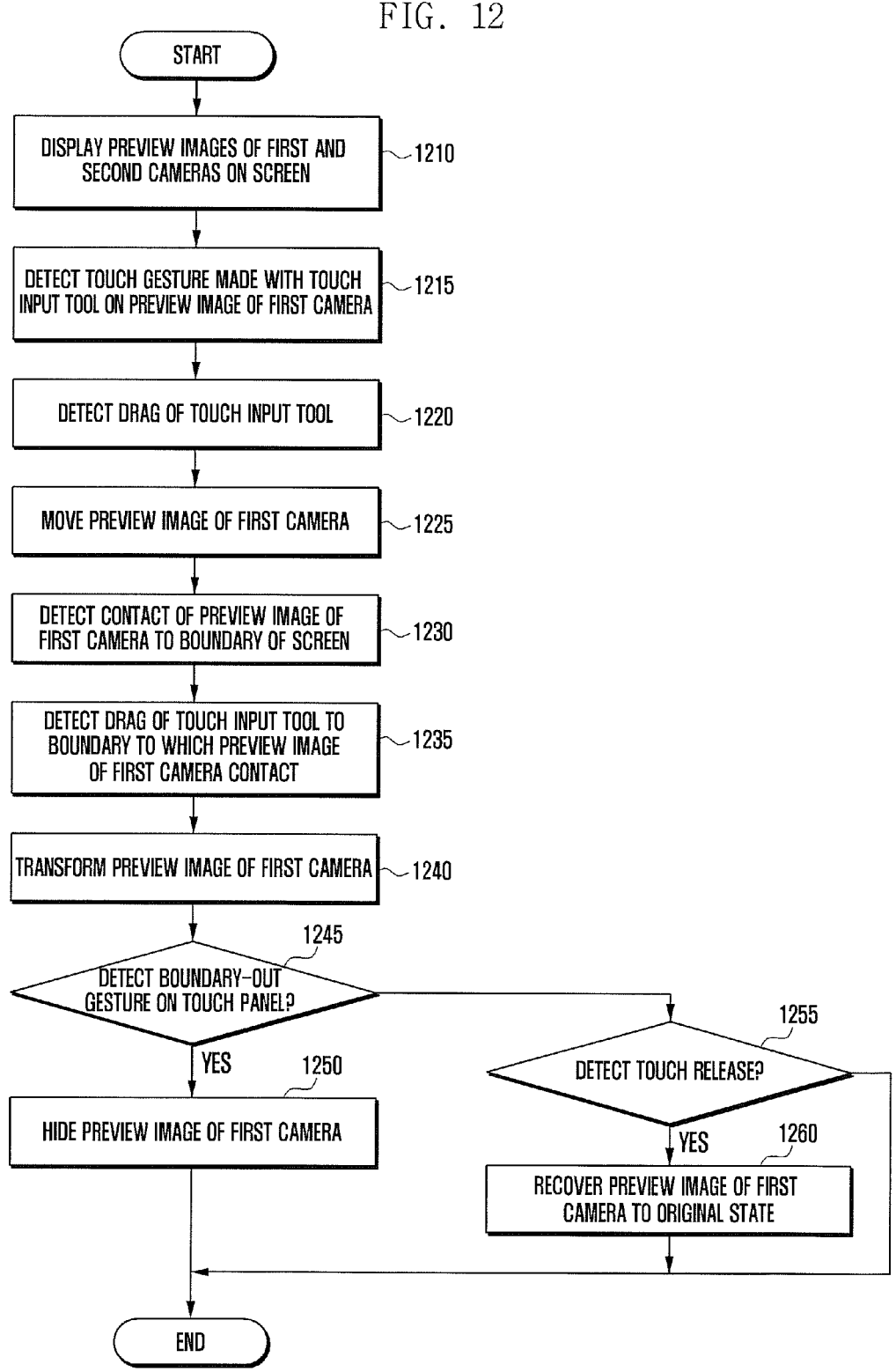
FIG. 12 is a flowchart illustrating a procedure of switching from a dual preview mode to a single preview mode in the preview control method according to an embodiment of the present invention.
Figure 13:
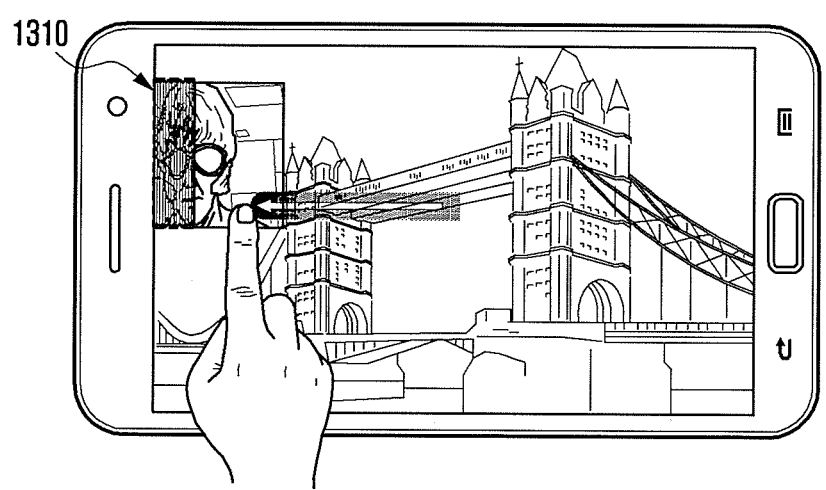
FIGS. 13 to 15 are diagrams illustrating exemplary screen displays for explaining the procedure of switching from the dual preview mode to the single preview mode according to the embodiment of FIG. 12.
Figure 14:
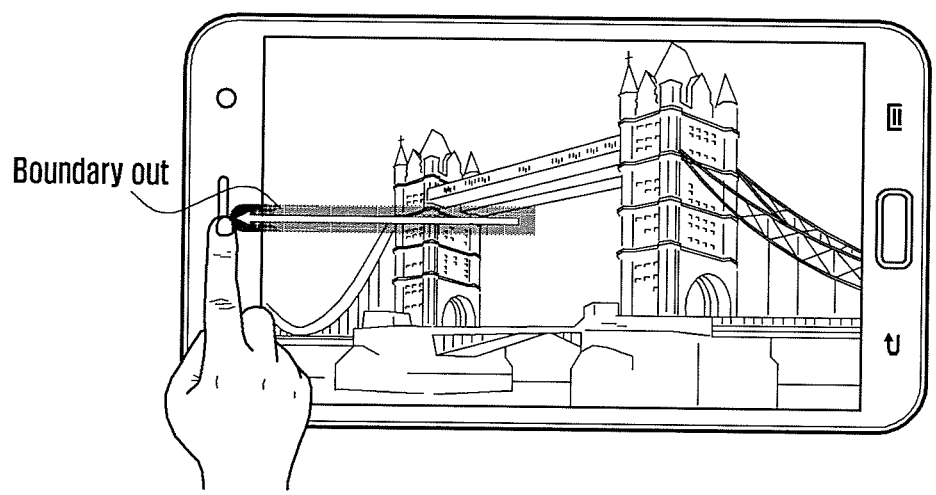
Figure 15:
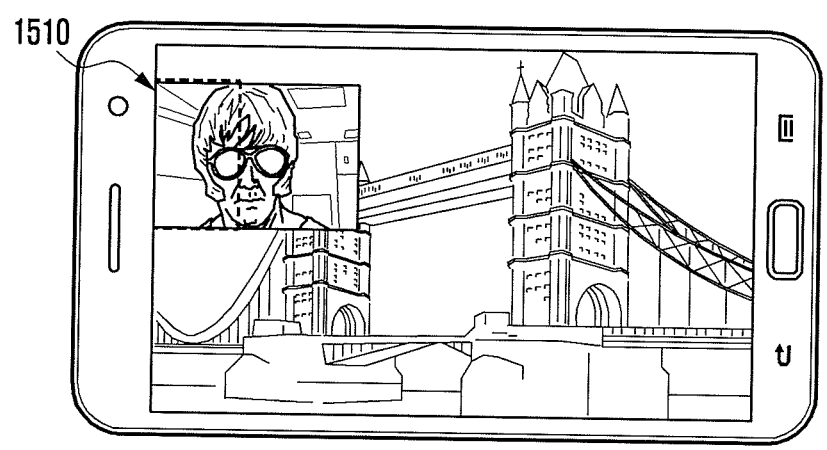

FIG. 12 is a flowchart illustrating a procedure of switching from a dual preview mode to a single preview mode in the preview control method according to an embodiment of the present disclosure. FIGS. 13 to 15 are diagrams illustrating screen displays for explaining the procedure of switching from the dual preview mode to the single preview mode according to the embodiment illustrated in FIG. 12.

The display unit 110 displays the second preview image of the second camera 170 and the first preview image of the first camera 160 on the second preview image under the control of the control unit 190. The control unit 190 detects a touch gesture made with the touch input tool on the first preview image of the first camera 160 at step 1215. The control unit 190 also detects the drag of the touch input tool subsequent to the touch gesture at step 1220. The control unit 190 controls the display unit 110 to move the first preview image of the first camera 160 in response to the drag of the touch input tool at step 1225. The control unit 190 detects the contact of the first preview image of the first camera 160 to the boundary of the screen at step 1230. Next, the control unit 190 detects a drag of the first preview image with the touch input tool in the direction to the screen boundary at step 1235. In response to the drag of the first preview image with the touch input tool in the direction to the screen boundary, the control unit 190 transforms the first preview image of the first camera 160 at step 1240. For example, the preview image 1310 is shrunk to the screen boundary as shown in FIG. 13.

At step 1245, the control unit 190 determines whether a boundary-out gesture is detected in the state where the preview image has been shrunk as shown in FIG. 13 at step 1245.

If the boundary-out gesture made with the touch input tool is detected on the touch panel 111 as shown in FIG. 14, the control unit 190 stops displaying the first preview image of the first camera 160 at step 1250. That is, the control unit 190 controls to switch from the dual preview mode to the single preview mode. If no boundary-out gesture is detected on the touch panel 111, the control unit 190 determines whether the touch release of the touch input unit is detected at step 1225. If the touch release is detected, the control unit 190 recovers the preview image of the first camera 160 to the original state at step 1260. For example, if the touch of the touch input tool is released at the boundary of the screen, the shrunk part 1310 (see FIG. 13) of the preview image is stretched to the original state such that the preview image is presented near the screen boundary as shown in FIG. 15.

Figure 16A:
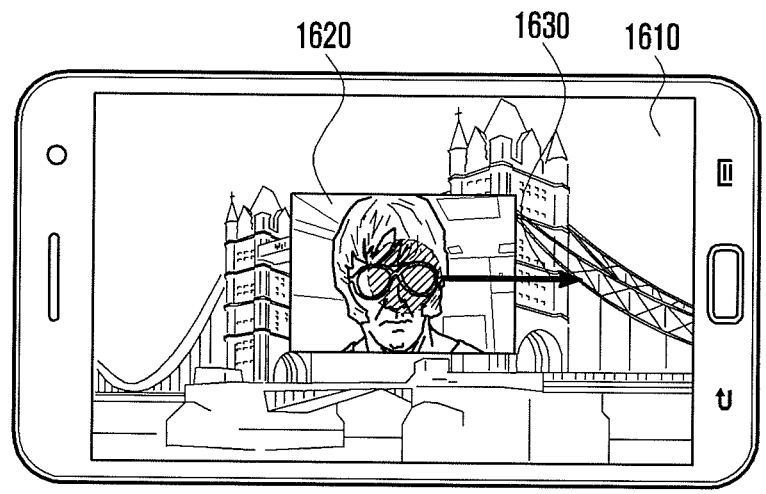
FIGS. 16a and 16b are diagrams illustrating exemplary screen displays for explaining the procedure of switching from the dual preview mode to the signal preview mode in the preview control method according to another embodiment of the present invention.
Figure 16B:
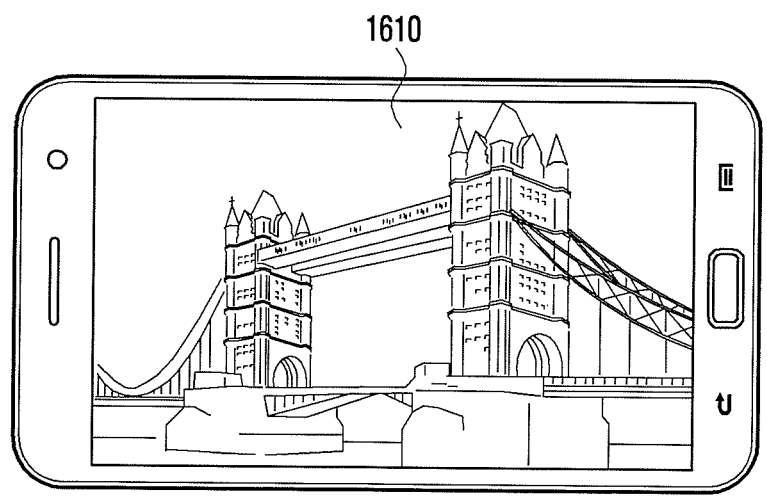

FIGS. 16a and 16b are diagrams illustrating exemplary screen displays for explaining the procedure of switching from the dual preview mode to the signal preview mode in the preview control method according to another embodiment of the present disclosure.

In the above embodiment, the description has been directed to the case where the user gesture for switching from the dual preview mode to the single preview mode is the drag gesture. In another embodiment of the present disclosure, the preview mode is switched from the dual preview mode to the signal preview mode in response to a flick gesture. For example, the display unit 110 displays the first preview image 1610 of the first camera 160 and the second preview image 1620 of the second camera 170 on the first preview image 1610 under the control of the control unit 190. If a flick gesture 1630 is detected on the second preview image 1620 of the second camera 170, the display unit 110 presents to the user a feedback in which the preview image 1620 moves out of the screen. As a consequence, only the first preview image 1610 of the first camera 160 is displayed on the screen as shown in FIG. 16b.

Figure 17:
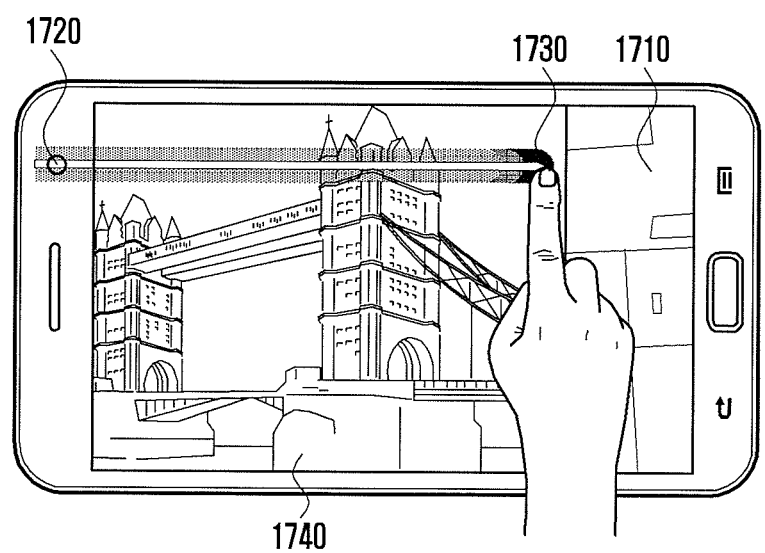
FIG. 17 is a diagram illustrating a screen display for explaining a procedure of switching between preview images in the preview control method according to an embodiment of the present invention.

FIG. 17 is a diagram illustrating a screen display for explaining a procedure of switching between preview images in the preview control method according to an embodiment of the present disclosure. Referring to FIG. 17, the control unit 190 controls the display unit 110 to display the first preview image 1710 of the first camera 160. If the user makes a touch on the lens window 1720 of the second camera 170 with the touch input tool 1730 and then drags the touch input tool 1730 in the direction to the inside of the screen, the control unit 190 detects a combined user gesture made on the second camera 170 and the touch panel 111. In response to the combined user gesture, the control unit 190 controls the display unit 110 to display the preview image 1740 of the second display unit 170. As shown in FIG. 17, the first preview image 1710 of the first camera 160 is replaced by the second preview image 1740 of the second camera 170 in response to the user gesture.

Figure 18A:
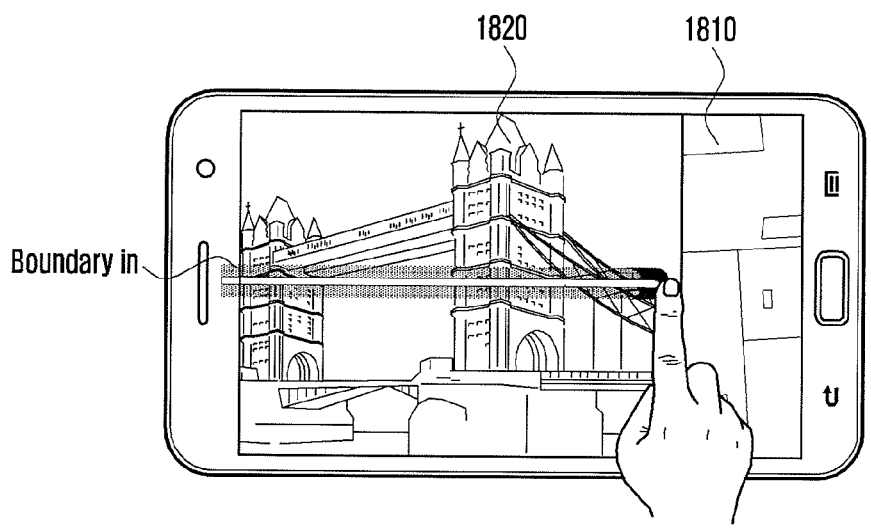
FIGS. 18a and 18b are diagrams illustrating screen displays for explaining a procedure of switching preview images in the preview control method according to another embodiment of the present invention.
Figure 18B:
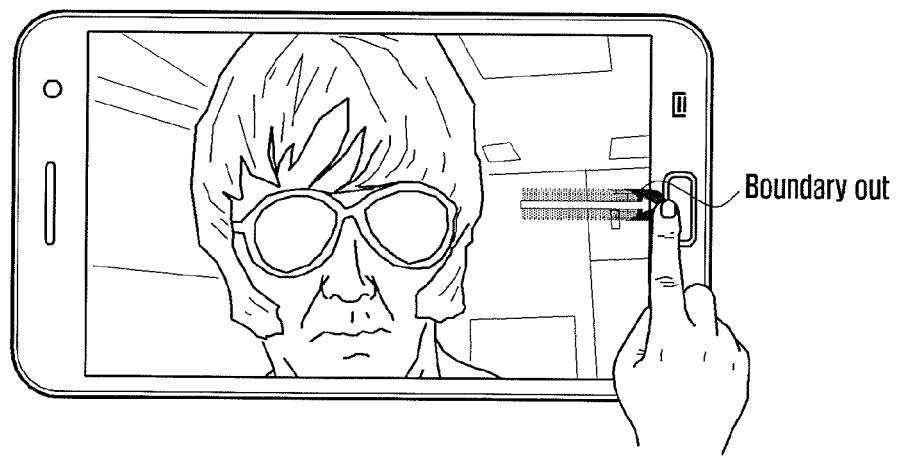

FIGS. 18a and 18b are diagrams illustrating screen displays for explaining a procedure of switching preview images in the preview control method according to another embodiment of the present disclosure. Referring to FIG. 18a, the control unit 190 controls the display unit 110 to displays the preview image 1810 of the first camera 160. If a boundary-in gesture is detected on the touch panel 111, the control unit 190 controls the display unit 110 to displays the preview image 1820 of the second camera 170. Referring to FIG. 18b, if a boundary-out gesture is detected on the touch panel 111, the control unit 190 controls the display unit 110 to display the preview image 1810 of the first camera.

Figure 19:
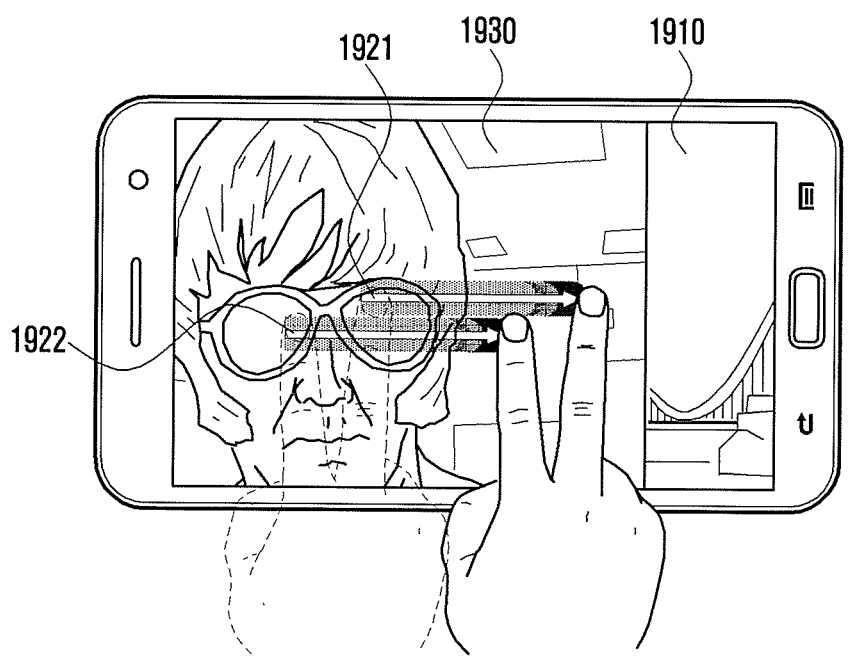
FIG. 19 is a diagram illustrating a screen display for explaining a procedure of switching preview images in the preview control method according to another embodiment of the present invention.

FIG. 19 is a diagram illustrating a screen display for explaining a procedure of switching preview images in the preview control method according to another embodiment of the present disclosure. Referring to FIG. 19, the control unit 190 controls the display unit 110 to display the preview image 1910 of the first camera 160. If a multi-touch having two touch points 1921 and 1922 of the touch input tools (e.g. index and middle fingers) is detected and a drag of the touch input tools follows, the control unit 190 controls the display unit 110 to display the preview image 1930 of the second camera 170.

Figure 20:
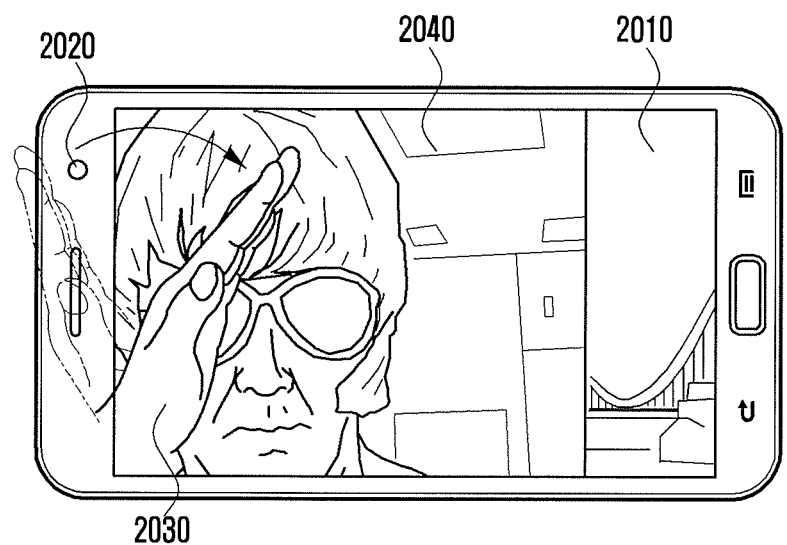
FIG. 20 is a diagram illustrating a screen display for explaining a procedure of switching preview images in the preview control method according to another embodiment of the present invention.

FIG. 20 is a diagram illustrating a screen display for explaining a procedure of switching preview images in the preview control method according to another embodiment of the present disclosure. Referring to FIG. 20, the control unit 190 controls the display unit 110 to display the preview image 2010 of the first camera 160. If a user gesture of shaking a hand 2030 in front of the lens window 2020 is detected by the second camera 170, the control unit 190 controls the display unit 110 to display the preview image 2040 of the second camera 170.

As described above, the preview control method and mobile terminal implementing the same according to the present disclosure is capable of controlling preview of the images input through the dual cameras intuitively and conveniently from the view point of the user.

The above-described preview control method according to an embodiment of the present disclosure can be implemented in the form of computer-executable program commands and stored in a computer-readable storage medium.

The computer readable storage medium may store the program commands, data files, and data structures in individual or combined forms. The program commands recorded in the storage medium may be designed and implemented for various exemplary embodiments of the present disclosure or used by those skilled in the computer software field. The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various exemplary embodiments of the present disclosure.

The preview control method and mobile terminal for implementing the same can be practiced with various modifications without departing from the spirit of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A preview control method of a mobile terminal, the method comprising:
   displaying a first preview image of a first camera on a screen;
   detecting a single user gesture sequentially contacted on a second camera and one area of a touch panel mounted on the screen, the one area of the touch panel is adjacent to the second camera;
   controlling, in response to detecting the single user gesture, a second preview image of the second camera to appear from a boundary; and
   displaying the second preview image of the second camera along with the first preview image of the first camera.

2. The method of claim 1, further comprising:
   detecting a multi-touch gesture having touch points contacting the first and second preview images on the touch panel; and
   switching positions of the first and second preview images in response to the multi-touch gesture.

3. The method of claim 1, further comprising:
   detecting a twist gesture onto the first and second preview images on the touch panel; and
   switching positions of the first and second preview images in response to the twist gesture,
   wherein the twist gesture including making a multi-touch gesture having touch points contacting the first and second preview images and rotating the touch points around a point.

4. The method of claim 1, further comprising:
   detecting a boundary-out gesture for moving the second preview image out of the screen on the touch panel; and
   hiding the second preview image in response to the boundary-out gesture.

5. The method of claim 1, further comprising:
   detecting a flick gesture to the second preview image on touch panel; and
   hiding the second preview image in response to the flick gesture.

6. The method of claim 1, further comprising:
   displaying the first preview image on the screen;
   detecting a boundary-in gesture made by moving a touch input tool from an outside to an inside of the screen on the touch panel; and
   displaying the second preview image along with the first preview image in response to the boundary-in gesture.

7. The method of claim 6, further comprising:
   detecting a boundary-out gesture for moving the second preview image out of the screen on the touch panel; and
   displaying the second preview image in response to the boundary-out gesture.

8. The method of claim 1, wherein the single user gesture contacted on the second camera is detected based on at least one of an image sensor of the second camera, a luminance sensor and a proximity sensor, and wherein the luminance sensor and the proximity sensor are arranged around a lens window of the second camera.

9. The method of claim 8, wherein the detecting the single user gesture based on the image sensor of the second camera comprises detecting a change in light quantity with the image sensor of the second camera, comparing the change in light quantity with a predetermined threshold and detecting the single user gesture if the change in light quantity is greater than the predetermined threshold.

10. The method of claim 1, wherein the single user gesture contacted on the one area of the touch panel mounted on the screen comprises at least one of a single touch, multi-touch, tap, double tap, long tap, tap and touch, drag, flick, press, pinch in, pinch out, boundary in, boundary out and twist.

11. The method of claim 1, further comprising:
    displaying a feedback of an appearance of the second preview image.

12. A mobile terminal comprising:
    a first camera and a second camera;
    a display configured to display at least one of a first preview image of the first camera and a second preview image of the second camera;
    a touch panel mounted on a screen; and
    a controller configured to detect a single user gesture sequentially contacted on the second camera and one area of a touch panel in a state of displaying the first preview image, the one area of the touch panel is adjacent to the second camera, control, in response to detecting the single user gesture, the second preview image to appear from a boundary of the screen, and control the display to display the second preview image along with the first preview image.

13. The mobile terminal of claim 12, wherein the controller is configured to detect a multi-touch gesture having touch points contacting the first and second preview images on the touch panel, and control the display to switch positions of the first and second preview images in response to the multi-touch gesture.

14. The mobile terminal of claim 12, wherein the controller is configured to detect a twist gesture onto the first and second preview images on the touch panel and controls the display to switch positions of the first and second preview images in response to the twist gesture, the twist gesture including making a multi-touch gesture having touch points contacting the first and second preview images and rotating the touch points around a point.

15. The mobile terminal of claim 12, wherein the controller is configured to detect a boundary-out gesture for moving the second preview image out of the screen on the touch panel, and control the display to hide the second preview image in response to the boundary-out gesture.

16. The mobile terminal of claim 12, wherein the controller is configured to detect a flick gesture to the second preview image on touch panel, and control the display to hide the second preview image in response to the flick gesture.

17. The mobile terminal of claim 12, wherein the single user gesture contacted on the second camera is detected based on at least one of an image sensor of the second camera, a luminance sensor and a proximity sensor, and wherein the luminance sensor and the proximity sensor are arranged around a lens window of the second camera.

18. The mobile terminal of claim 17, wherein the controller is configured to detect a change in light quantity with the image sensor of the second camera, compare the change in light quantity with a predetermined threshold and detect the single user gesture if the change in light quantity is greater than the predetermined threshold.

19. The mobile terminal of claim 12, wherein the single user gesture contacted on the one area of the touch panel mounted on the screen comprises at least one of a single touch, multi-touch, tap, double tap, long tap, tap and touch, drag, flick, press, pinch in, pinch out, boundary in, boundary out and twist.

20. The mobile terminal of claim 12, wherein the controller is configured to display a feedback of an appearance of the second preview image.

* * * * *